(12) United States Patent
Sodagar et al.

(10) Patent No.: US 11,592,589 B2
(45) Date of Patent: Feb. 28, 2023

(54) SEISMIC ATTRIBUTE MAP FOR GAS DETECTION

(71) Applicant: SAUDI ARABIAN OIL COMPANY, Dhahran (SA)

(72) Inventors: Taher M. Sodagar, Dhahran (SA); Amin Z. Alali, Al Mallahah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/148,611

(22) Filed: Jan. 14, 2021

(65) Prior Publication Data
US 2022/0221607 A1    Jul. 14, 2022

(51) Int. Cl.
*G01V 1/34* (2006.01)
*G01V 1/30* (2006.01)

(52) U.S. Cl.
CPC .............. *G01V 1/345* (2013.01); *G01V 1/306* (2013.01); *G01V 1/307* (2013.01)

(58) Field of Classification Search
CPC ......... G01V 1/345; G01V 1/306; G01V 1/307
See application file for complete search history.

(56) References Cited

U.S. PATENT DOCUMENTS

| | | | |
|---|---|---|---|
| 4,363,112 A | 12/1982 | Widrow | |
| 5,671,136 A * | 9/1997 | Willhoit, Jr. | G01V 1/30 702/18 |
| 5,850,622 A | 12/1998 | Vassiliou et al. | |

(Continued)

FOREIGN PATENT DOCUMENTS

| CA | 1240026 A | 8/1988 |
|---|---|---|
| CN | 109001800 A | 12/2018 |

(Continued)

OTHER PUBLICATIONS

Deng, Ji-Xin et al., "Application of Spectral Decomposition to Detect Deepwater Gas Reservoir", SEG/San Antonio 2007 Annual Meeting, Sep. 2007, pp. 1427-1431 (5 pages).

(Continued)

*Primary Examiner* — Raymond L Nimox
(74) *Attorney, Agent, or Firm* — Osha Bergman Watanabe & Burton LLP (57) ABSTRACT

A method of obtaining a relative amplitude preserved seismic volume acquired in a time-domain for a subterranean region of interest and transforming it into a low-frequency monospectral amplitude volume. The method further determines a seismic attenuation volume from the relative amplitude preserved seismic volume acquired in the time-domain. Furthermore, the method generates a low-frequency monospectral amplitude map for a surface of interest by averaging the low-frequency monospectral amplitude volume over a depth-window around the surface of interest, and generates a seismic attenuation map for a surface of interest by averaging the seismic attenuation volume over a depth-window around the surface of interest. The method further determines an attribute map based on the seismic attenuation map and the low-frequency monospectral amplitude map for the surface of interest, and determines a presence of gas in the subterranean region of interest based on the attribute map.

19 Claims, 8 Drawing Sheets

(56) References Cited

U.S. PATENT DOCUMENTS

| | | | |
|---|---|---|---|
| 6,052,333 | A | 4/2000 | Williams |
| 8,213,261 | B2 | 7/2012 | Imhof et al. |
| 9,279,897 | B2 | 3/2016 | Zuercher |
| 11,119,239 | B2* | 9/2021 | Kouchmeshky .......... G01V 3/38 |
| 2006/0235666 | A1 | 10/2006 | Assa et al. |
| 2009/0037114 | A1* | 2/2009 | Peng ........................ G01V 1/28 702/14 |
| 2011/0218737 | A1* | 9/2011 | Gulati ..................... G06T 15/00 702/16 |
| 2011/0295510 | A1* | 12/2011 | Gulati ..................... G01V 1/288 702/16 |
| 2012/0090834 | A1 | 4/2012 | Imhof et al. |
| 2012/0257476 | A1 | 10/2012 | Muhl |
| 2014/0372044 | A1 | 12/2014 | Jiao et al. |
| 2015/0138915 | A1 | 5/2015 | Khan et al. |
| 2015/0168574 | A1 | 6/2015 | Wallet et al. |
| 2016/0086079 | A1 | 3/2016 | De Stefano |
| 2016/0313460 | A1 | 10/2016 | Berron et al. |
| 2018/0024262 | A1 | 1/2018 | Madof |
| 2018/0024263 | A1* | 1/2018 | Aarre ...................... G01V 1/364 367/43 |
| 2018/0217284 | A1 | 8/2018 | Zhao et al. |
| 2020/0166664 | A1 | 5/2020 | Bin Gubair et al. |
| 2020/0191985 | A1 | 6/2020 | Kristiansen et al. |
| 2020/0333491 | A1 | 10/2020 | Bekara |
| 2020/0348430 | A1* | 11/2020 | Tan ........................ G01V 1/303 |
| 2020/0348432 | A1 | 11/2020 | Sodagar |
| 2021/0215842 | A1 | 7/2021 | Liu et al. |
| 2021/0278557 | A1 | 9/2021 | Awfi |

FOREIGN PATENT DOCUMENTS

| | | |
|---|---|---|
| CN | 111077570 A | 4/2020 |
| CN | 111123354 A | 5/2020 |
| CN | 111239808 A | 6/2020 |
| RU | 2007108956 A | 9/2008 |
| WO | 2008059450 A3 | 5/2008 |
| WO | 2011109839 A2 | 9/2011 |
| WO | 2019241062 A1 | 12/2019 |

OTHER PUBLICATIONS

Wilson, Adam et al., "Frequency-dependent AVO inversion", SEG Houston 2009 International Exposition and Annual Meeting, Oct. 2009, pp. 341-345 (5 pages).

Bouchaala, Fateh and Claude Guennou, "Estimation of viscoelastic attenuation of real seismic data by use of ray tracing software: Application to the detection of gas hydrates and free gas", Comptes Rendus Geoscience, ScienceDirect, Elsevier Masson SAS, vol. 344, Mar. 2012, pp. 57-66 (10 pages).

Chand, Shyam and Tim. A. Minshull, "The effect of hydrate content on seismic attenuation: A case study for Mallik 2L-38 well data, Mackenzie delta, Canada", Geophysical Research Letters, American Geophysical Union, vol. 31, L14609, 2004, pp. 1-4 (4 pages).

Chen, Ganglin et al., "Spectral-decomposition response to reservoir fluids from a deepwater West Africa reservoir", Geophysics, Society of Exploration Geophysicists, vol. 73, No. 6, Nov.-Dec. 2008, pp. C23-C30 (8 pages).

Priest, Jeffrey A. et al., "Attenuation of seismic waves in methane gas hydrate-bearing sand", Geophysical Journal International, vol. 164, Issue 1, Jan. 2006, pp. 149-159 (11 pages).

Sodagar, Taher M., "Revelation of the Triassic Gas Potential with Insight of Iso Frequency Spectral Decomposition in Saudi Arabia's Offshore", SPE-172625-MS, Society of Petroleum Engineers, Mar. 2015, pp. 1-16 (16 pages).

Wang, Yanghua, "Seismic time-frequency spectral decomposition by matching pursuit", Geophysics, Society of Exploration Geophysicists, vol. 72, No. 1, Jan.-Feb. 2007, pp. V13-V20 (8 pages).

Wang, Zhiguo et al., "3D seismic attributes for a tight gas sand reservoir characterization of the eastern Sulige gas field, Ordos Basin, China", Geophysics, Society of Exploration Geophysicists, vol. 80, No. 2, Mar.-Apr. 2015, pp. B35-B43 (9 pages).

Wang, Zhiguo et al., "Application of 3D seismic attributes to optimize the placement of horizontal wells within a tight gas sand reservoir, Ordos Basin, China", Geophysics, Society of Exploration Geophysicists, vol. 81, No. 3, May-Jun. 2016; pp. B77-B86 (10 pages).

Wood, Warren T. et al., "In Situ Measurements of P-Wave Attenuation in the Methane Hydrate-and Gas-Bearing Sediments of the Blake Ridge", Proceedings of the Ocean Drilling Program, Scientific Results, vol. 164, 2000, pp. 265-272 (8 pages).

Yang, Zhifang et al., "Tight gas detection based on the reflectivity dispersion technology", Petroleum Exploration and Development, Research Institute of Petroleum Exploration and Development, ScienceDirect, Elsevier B.V., vol. 41, Issue 5, Oct. 2014, pp. 628-633 (6 pages).

International Search Report and Written Opinion issued in Application No. PCT/US2021/012517, dated Apr. 22, 2022 (15 pages).

L. Lifeng et al.; "Seismic attributes and integrated prediction of fractured and caved carbonate reservoirs in the Tarim Basin, China", Petroleum Science; vol. 8; 2011; pp. 455-461 (7 pages).

Castagna et. al.; "Instantaneous spectral analysis: Detection of low-frequency shadows associated with hydrocarbons"; The Leading Edge; vol. 22; Issue 2; Feb. 1, 2003; pp. 120-127 (6 pages).

Chopra, S. & Marfurt, K. J., "Seismic Attributes for Prospect Identification and Reservoir Characterization" Society of Exploration Geophysicists; Chapter 6; Jul. 7, 2007; pp. 123-151 (29 pages).

Yilmaz, O.; "Seismic Data Analysis"; Society of Exploration Geophysicists; Chapter 11; vol. 2; 2001; pp. 1793-2027 (235 pages).

Odebeatu et. al.; "Application of spectral decomposition to detection of dispersion anomalies associated with gas saturation"; The Leading Edge; vol. 25; Issue 2; Feb. 1, 2006; pp. 206-210 (5 pages).

Sodagar, T.; "Revelation of the Triassic Gas Potential with Insight of Iso Frequency Spectral Decomposition in Saudi Arabia's Offshore", SPE-172625-MS, Soecity of Petroleum Engineers, Mar. 8, 2015, pp. 1-16 (16 pages).

Gao, W et al.; "An improved pre-stack hydrocarbon detection method based on frequency decomposition and spectral decomposition", Society of Exploration Geophysicists; Aug. 27, 2018; pp. 3317-3321 (5 pages).

Li, Y. et al.; "Hydrocarbon detection for Ordovician carbonate reservoir using amplitude variation with offset and spectral decomposition", Interpretation; vol. 4; No. 3; Aug. 1, 2016; pp. SN11-SN30 (20 pages).

Xiaodong, W. et al.; "Application of spectral decomposition in hydrocarbon detection", SEG Technical Program Expanded Abstracts; Jan. 1, 2011; pp. 1041-1045 (5 pages).

Burnett et. al.; "Application of spectral decomposition to gas basins in Mexico"; The Leading Edge; vol. 22; Issue 11; Nov. 1, 2003; pp. 1130-1134 (5 pages).

Chapman et. al.; "The influence of abnormally high reservoir attenuation on the AVO signature"; The Leading Edge; vol. 24; Issue 11; Nov. 1, 2005; pp. 1120-1125 (5 pages).

Deng et al.; "Application of Spectral Decomposition to Detect Deepwater Gas Reservoir"; Society of Exploration Geophysicists; Jan. 1, 2007; pp. 1427-1431 (5 pages).

Partyka et. al.; "Interpretational applications of spectral decomposition in reservoir characterization"; vol. 18; Issue 3; Mar. 1, 1999; pp. 353-360 (5 pages).

Rapoport et. al.; "Direct detection of oil and gas fields based on seismic inelasticity effect"; The Leading Edge; vol. 23; Issue 3; Mar. 1, 2004; pp. 276-278 (3 pages).

International Search Report and Written Opinion issued in Application No. PCT/US2021/053551, dated Jan. 21, 2022 (12 pages).

T. M. Sodagar, "Iso Frequency Spectral Decomposition Ratio Technology Workflow for Gas Carbonate Field Developments and Characterization", First EAGE Reservoir Characterization and Modelling Workflows for Giant Carbonate Field; Feb. 18, 2019; pp. 1-4 (4 pages).

P. Guizada et al.; "Application of Underbalanced Coiled Tubing Drilling Technology to Enhance Gas Production in Deep Carbonate Reservoirs", SPE-192786-MS; Society of Petroleum Engineers; Nov. 2018; pp. 1-8 (8 pages).

(56) References Cited

OTHER PUBLICATIONS

Non-Final Office Action issued in corresponding U.S. Appl. No. 17/064,025 dated Oct. 28, 2021 (17 pages).
Final Office Action issued in corresponding U.S. Appl. No. 17/064,025 dated Mar. 9, 2022 (18 pages).
Non-Final Office Action issued in corresponding U.S. Appl. No. 17/064,025 dated Aug. 29, 2022 (23 pages).

* cited by examiner

SEISMIC ATTRIBUTE MAP FOR GAS DETECTION

BACKGROUND

In some situations, a portion of the reservoir within the subterranean region of interest may contain a gas deposit. In some situations, it may be desirable to detect the gas deposit using a seismic survey. Portions of the reservoir containing a gas deposit may affect the characteristics of the reflected seismic waves and refracted seismic waves differently from portions of the reservoir contains fluids, whether oil or water. In some situations, it may be desirable to drill a wellbore into a gas deposit to produce the gas to the surface. Such a wellbore may be a vertical wellbore or may be a horizontal wellbore constructed using geosteering methods.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. In general, in one aspect, embodiments relate to obtaining a relative amplitude preserved seismic volume acquired in a time-domain for a subterranean region of interest and transforms the seismic volume into a low-frequency monospectral amplitude volume. The method further determines a seismic attenuation volume from the relative amplitude preserved seismic volume acquired in the time-domain. The method further generates a low-frequency monospectral amplitude map for a surface of interest by averaging the low-frequency monospectral amplitude volume over a depth-window around the surface of interest. The method further generates a seismic attenuation map for a surface of interest by averaging the seismic attenuation volume over a depth-window around the surface of interest. The method further determines an attribute map based on the seismic attenuation map and the low-frequency monospectral amplitude map for the surface of interest. The method also determines a presence of gas in the subterranean region of interest based on the attribute map.

In general, in one aspect, embodiments relate to a system including a seismic processor which includes a computer processing unit capable of executing instructions stored in a non-transitory computer storage medium. The system obtains a relative amplitude preserved seismic volume acquired in a time-domain for a subterranean region of interest and transform the seismic volume into a low-frequency monospectral amplitude volume. The system further determines a seismic attenuation volume from the seismic volume, and generates a low-frequency monospectral amplitude map for a surface of interest by averaging the low-frequency monospectral amplitude volume over a depth-window around the surface of interest. Furthermore, The system generates a seismic attenuation map for a surface of interest by averaging the seismic attenuation volume over a depth-window around the surface of interest. The system further determines an attribute map based, at least in part, on the seismic attenuation map and the low-frequency monospectral amplitude map for the surface of interest, and the system also determines a presence of gas in the subterranean region of interest based on the attribute map.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
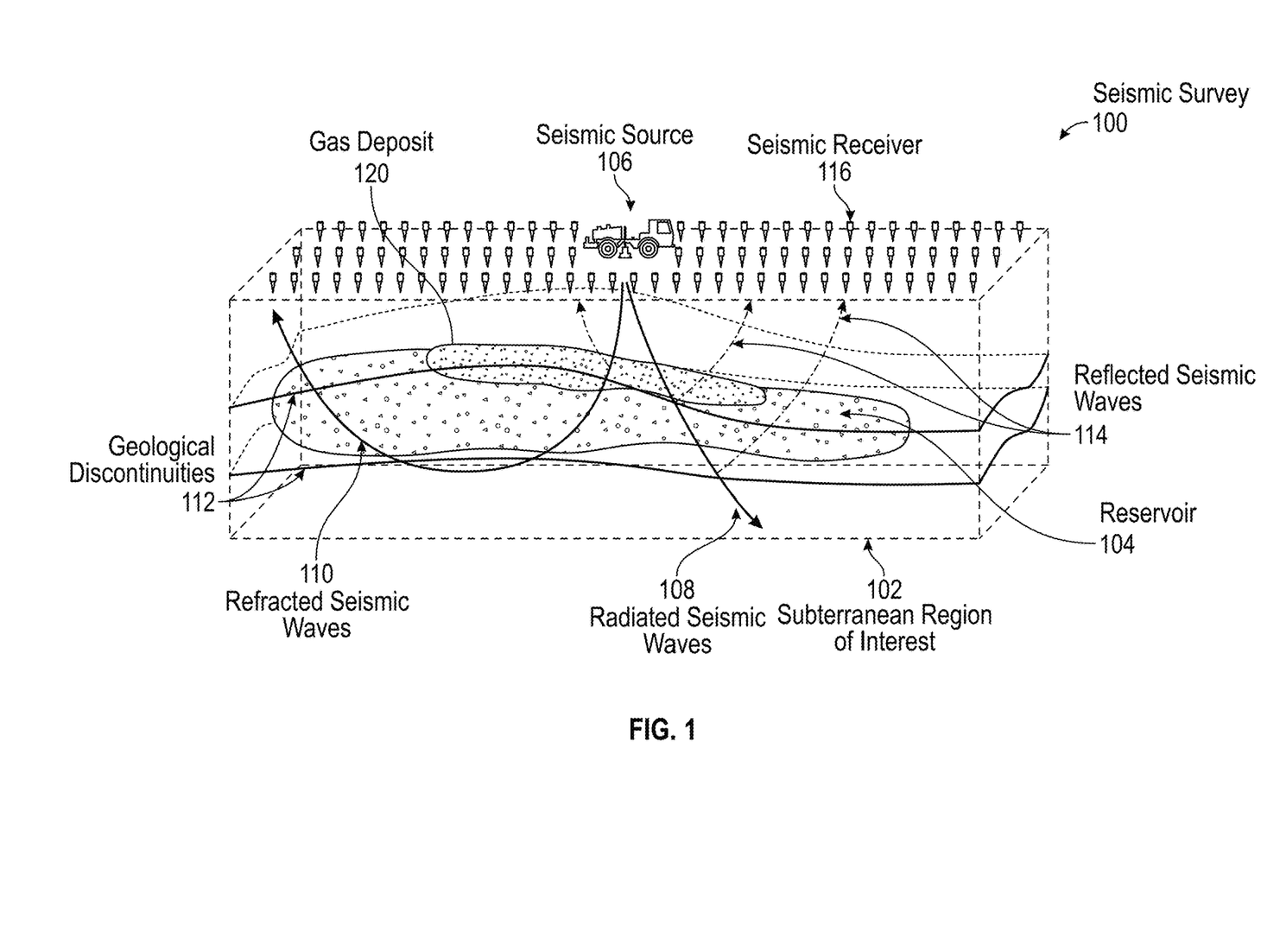
FIG. 1 depicts a seismic survey in accordance with one or more embodiments.

FIG. 1 shows a seismic survey (100) of a subterranean region of interest (102), which may contain a reservoir (104) The seismic survey (100) may utilize a seismic source (106) that generates radiated seismic waves (108). The radiated seismic waves (108) may return to the surface as refracted seismic waves (110), or may be reflected by geological discontinuities (112) and return to the surface as reflected seismic waves (114). One type of geological discontinuity may be a gas deposit (120). At the surface, the refracted seismic waves (110) and reflected seismic waves (114) may be detected by seismic receivers (116).

In some embodiments, the refracted seismic waves (110) and reflected seismic waves (114) generated by a single activation of the seismic source (106) are recorded by a seismic receiver (116) as a time-series representing the amplitude of ground-motion at a sequence of discreet times. This time-series may be denoted a seismic "trace". The seismic receivers (116) are positioned at a plurality of seismic receiver locations which we may denote $(x_r, y_r)$ where x and y represent orthogonal axes on the earth's surface above the subterranean region of interest (102). Thus, the refracted seismic waves (110) and reflected seismic waves (114) generated by a single activation of the seismic source (106) may be represented as a three-dimensional "3D" volume with axes ($x_r$, $y_r$, t) where ($x_r$, $y_r$) represents the location of the seismic receiver (116) and t delimits the time sample at which the amplitude of ground-motion was measured.

However, a seismic survey (100) may include recordings of seismic waves generated by a seismic source (106) that is positioned at a plurality of seismic source locations denoted ($x_s$, $y_s$). Thus, the seismic volume for a seismic survey (100) may be represented as a five-dimensional volume, denoted ($x_s$, $y_s$, $x_r$, $y_r$, t).

Figure 2:
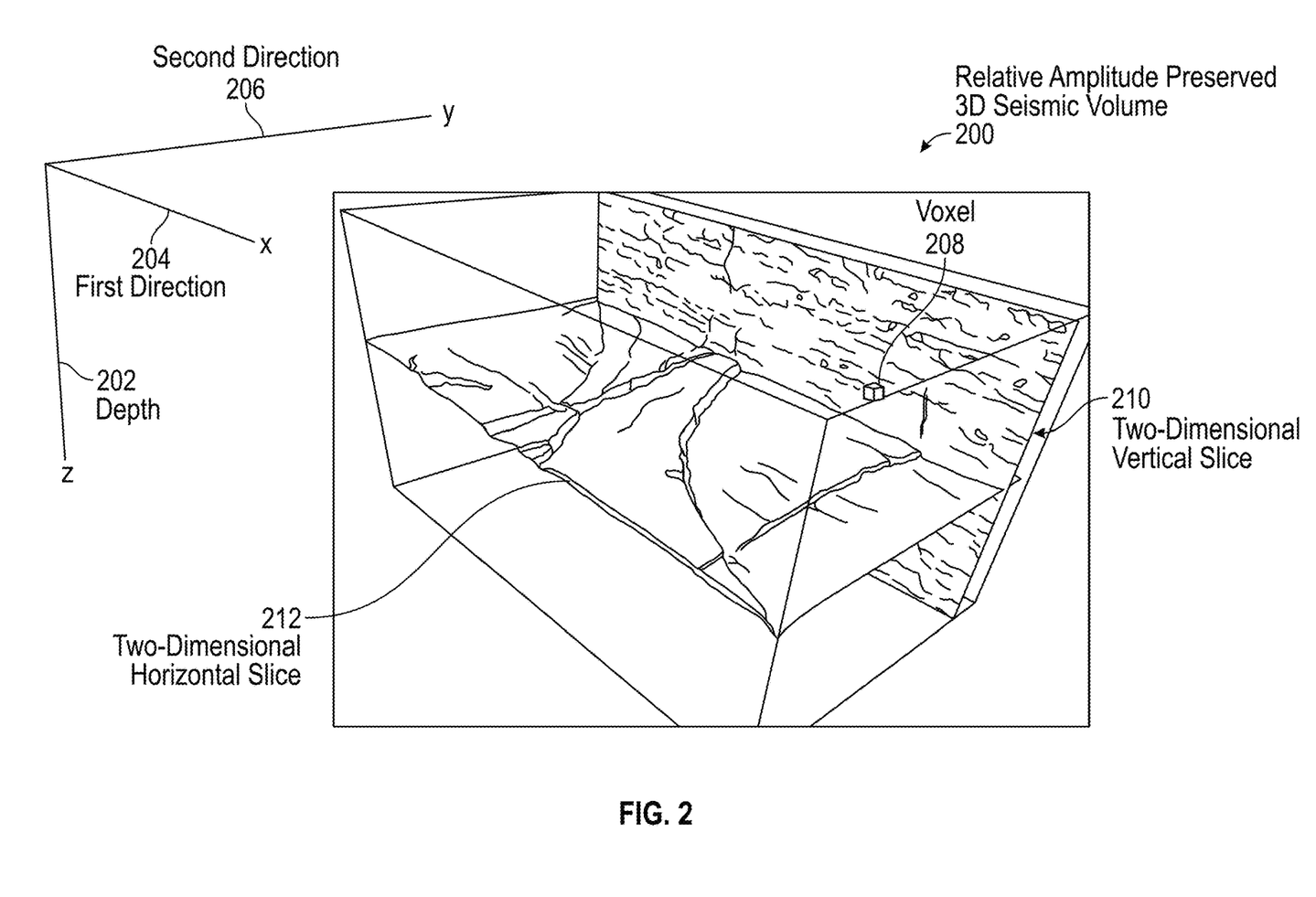
FIG. 2 shows a relative amplitude preserved 3D seismic volume in accordance with one or more embodiments.

FIG. 2 shows a three-dimensional (3D) seismic volume in accordance with some embodiments. Seismic processing reduces a five-dimensional seismic volume produced by a seismic survey (100) to a 3D seismic volume (200) with one depth dimension (202), a first horizontal dimension (204), and a second horizontal dimension (206), where the first horizontal dimension (204) is orthogonal to the second horizontal direction (206) representing a 3D image of the subterranean region of interest. Seismic processing performs this reduction from a five-dimensional seismic volume to a 3D seismic volume by correcting the recorded time of seismic waves for the time of travel ("migration") from the seismic source (106) to the seismic receiver (116) and summing ("stacking") samples over two space dimensions.

According to some embodiments, the migration is performed after approximating the velocity of seismic wave propagation as a function only of depth position, but not of horizontal position. Migration using this approximation is called "time-migration." According to some embodiments, the migration is performed without constraining the manner in which the velocity of seismic wave propagation varies. Migration using this approximation is called "depth-migration."

Thus, there are four possible combinations of the stacking and migration processes. Stacking before migration may produce "post-stack time-migration" if time-migration is used, and "post-stack depth-migration" if depth-migration is used. Migrating before stacking may produce "pre-stack time-migration" if time-migration is used, and "pre-stack depth-migration" if depth-migration is used. Each combination may be a relative amplitude preserved 3D seismic volume (200) representing a 3D image of the subterranean region of interest. According to some embodiments, the relative amplitude preserved 3D seismic volume (200) may in two-dimensional (2D) spatial coordinates and depth or time. FIG. 2 depicts a 2D slice through a 3D seismic volume. A 3D pixel ("voxel") (208) of the 3D seismic volume (200) may have a value representing an estimate of an attribute of the subterranean volume of interest at the position of the voxel. For example, the attribute may be without limitation, a seismic wave reflection amplitude, or a monospectral amplitude, or a coherence value. FIG. 2 shows a 2D vertical slice (210) and a 2D horizontal slice (212) though the 3D seismic volume (200).

Figure 3:
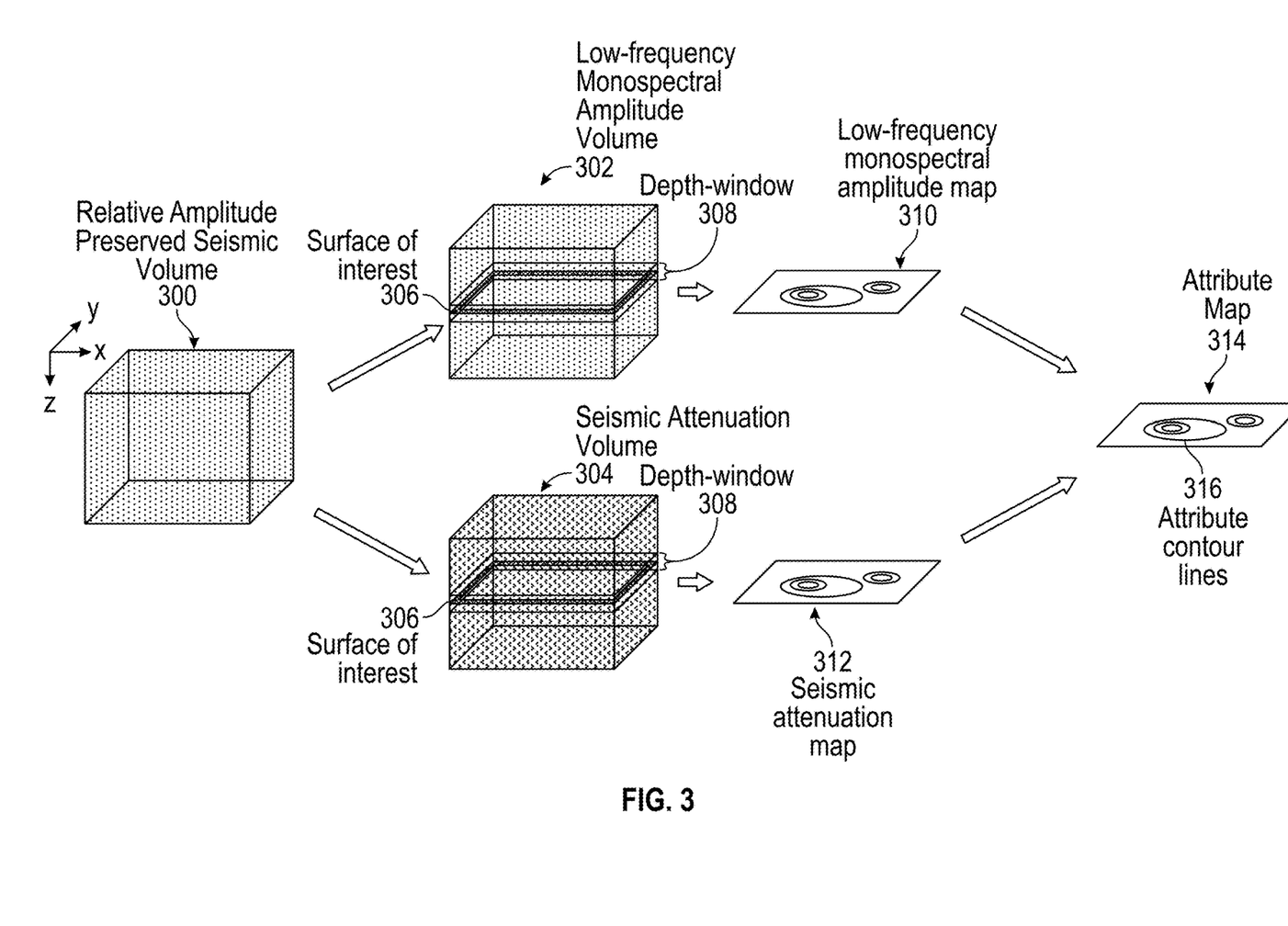
FIG. 3 shows volumes and maps, in accordance with one or more embodiments.

FIG. 3 shows volumes and maps, in accordance with one or more embodiment. The relative amplitude preserved seismic volume (300) may the relative amplitude preserved seismic volume (200), shown in FIG. 2. A low-frequency monospectral amplitude volume (302) may be determined via a transformation from the relative amplitude preserved seismic volume (300). According to some embodiments, a low-frequency monospectral amplitude volume (302) represents an amplitude of a single frequency component of the time-domain signal at each spatial position in 3D space. According to one or more embodiments, the low-frequency monospectral amplitude volume (302) may represents an amplitude of a single vertical wavenumber component of the depth-domain signal at each spatial position in 3D space provided the amplitude was preserved when converting the seismic volume from time-domain to depth-domain. According to some embodiments, this transformation may be performed by applying a Gabor transform along the depth axis of the relative amplitude preserved 3D seismic volume (200). According to some embodiments, this transformation may be performed by applying a Continuous Wavelet transform along the depth axis of the relative amplitude preserved 3D seismic volume (200). According to some embodiments, this transformation may be performed by applying a Discrete Wavelet transform along the depth axis of the relative amplitude preserved 3D seismic volume (200). Other methods for transforming the relative amplitude preserved 3D seismic volume (200) into a low-frequency monospectral volume (302) may be apparent to one skilled in the art.

A seismic attenuation volume (304) may be determined from the relative amplitude preserved seismic volume (300). Seismic attenuation may include intrinsic seismic attenuation, in which seismic energy is converted into heat, and extrinsic seismic attenuation in which coherent seismic waves are scattering into incoherent signals. Effective seismic attenuation may include the effects of both intrinsic and extrinsic seismic attenuation Methods proposed for seismic attenuation determination are based on the attenuation-induced changes in the spectral properties of seismic wavelets. A seismic trace may be analyzed using the Gabor transform spectrum to observe the time varying frequency content of the seismic trace. This analysis method avoids the issue of interference from other seismic waves. Other methods for estimating seismic attenuation in seismic traces include the spectral ratio method, the centroid frequency-shift method, and the peak frequency-shift method. The seismic attenuation volume may be calculated by any of the methods discussed above, or by any other method familiar to one of ordinary skill in the art. In addition, the seismic attenuation volume (304) may be an effective attenuation volume, an intrinsic attenuation volume, and an instantaneous attenuation volume.

In accordance with some embodiments, a surface of interest (306) may be selected on which to determine a plurality of maps. The location of the surface of interest (306) may vary as a function of depth. The surface of interest (306) may be the top of a hydrocarbon reservoir, or the base of a hydrocarbon reservoir. The surface of interest may be a geological surface of interest to the operator of the method. In accordance with one or more embodiments, a surface of interest (306) may be a depth of interest, which is invariant with horizontal spatial position. The depth of interest may lie within a hydrocarbon reservoir.

In addition, in accordance with one or more embodiments, a depth-window (308) surrounding the surface of interest (306) is defined. The depth-window (308) may be centered on the surface of interest (306) extending an equal depth interval above and below the surface of interest (306). Alternatively, the surface of depth-window (308) may be centered on the surface of interest (306) extending an equal interval on either side of the surface of interest (306) in a direction normal to the surface of interest (306). In other embodiments, the depth-window (308) may lie entirely above the surface of interest (306), or the depth-window (308) may lie entirely below the surface of interest (306). In accordance with the one or more embodiments, the depth-window (308) is of invariant thickness everywhere within the subterranean region of interest. In other embodiments, the depth-window (308) varies as a function of horizontal spatial location.

A low-frequency monospectral amplitude map (310) for the surface of interest (306) is determined from the low-frequency monospectral amplitude volume (302) by averaging the values of low-frequency monospectral amplitude within the depth-window (308) at each horizontal spatial location. This averaging may be performed by one of many methods well known to one of ordinary skill in the art. For example, the averaging may include, without limitation, forming the root mean square (RMS), mean, mode, median, harmonic mean, geometric mean, weighted-mean, weighted-mode, weighted-median, weighted-harmonic mean, weighted-geometric mean, trimmed-mean, trimmed-median, trimmed-harmonic mean, or trimmed-geometric mean.

A seismic attenuation map (312) for the surface of interest (306) is determined from the seismic attenuation volume (304) by averaging the values of seismic attenuation within the depth-window (308) at each horizontal spatial location. This averaging may be performed by one of many methods well known to one of ordinary skill in the art, such as those listed above.

The determination of the low-frequency monospectral amplitude map (310), may also include, in accordance with one or more embodiments, the application of filters to the low-frequency monospectral amplitude map (310). The filters may be spatial filters, such as spatially-smoothing filters, dip-guided filters, structure-oriented filters, deterministic filters, and statistical filters.

Similarly, the determination of the seismic attenuation map (312) may also include, in accordance with one or more embodiments, the application of filters to the low-frequency monospectral amplitude map (310). The filters may be spatial filters, such as spatially-smoothing filters, dip-guided filters, structure-oriented filters, deterministic filters, and statistical filters.

The low-frequency monospectral amplitude map (310), and the seismic attenuation map (312) are combined to determine an attribute map (314). In accordance with one or more embodiments, the value of each pixel in the attribute map (314) is calculated as the ratio of the value of a pixel in the seismic attenuation map (312) to the value of a pixel in the low-frequency monospectral amplitude map (310). In other embodiments, the ratio may be inverted and the value of each pixel in the attribute map (314) is calculated as the ratio of the value of a pixel in the low-frequency monospectral amplitude map (310) to the value of a pixel in seismic attenuation map (312). In still further embodiments, the value of each pixel in the attribute map (314) is calculated from a plurality of pixels in the seismic attenuation map (312), and a plurality of pixels in the low-frequency monospectral amplitude map (310).

The attribute map is displayed, in accordance with one or more embodiments, either as a plurality of pixels of varying colors, hues, saturations, or as a grayscale representing the values of the attribute within the pixel, or as contour lines (316) connecting pixels with equal attribute values.

Figure 4:
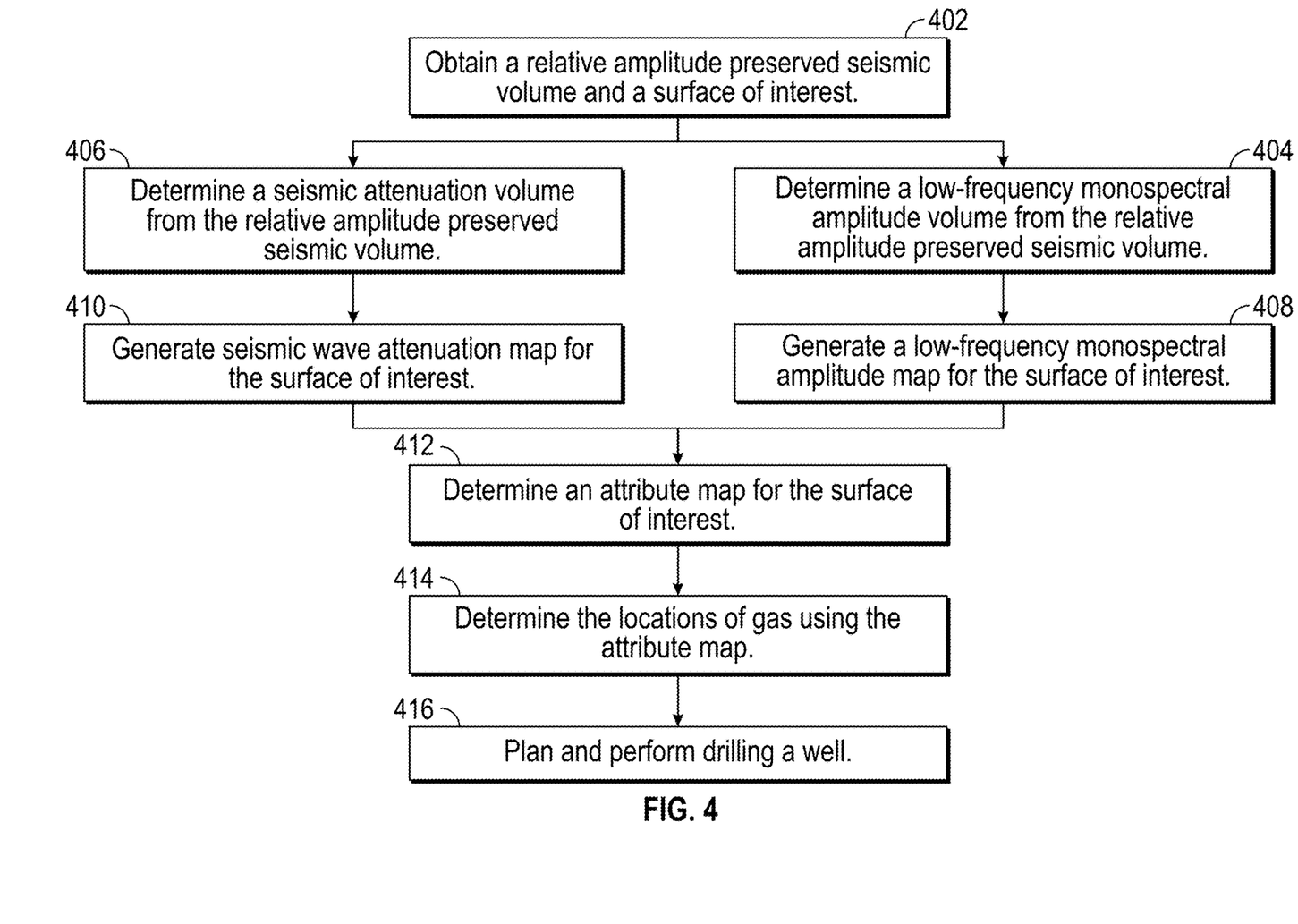
FIG. 4 shows a flowchart for finding the location of gas, in accordance with one or more embodiments.

FIG. 4 shows a workflow in accordance with one or more embodiment. One or more blocks in FIG. 4 may be performed by one or more components as described in FIG. 7 (e.g., computer processor(s) 760). While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 402, a relative amplitude preserved 3D seismic volume (200) resulting from processing a seismic survey (100) for a subterranean region of interest is obtained. Processing a seismic survey (100) to obtain a 3D relative amplitude preserved 3D seismic volume (200) requires that each step in the processing chain, such as correcting for heterogeneities near the seismic source and seismic receivers, correcting for geometrical spreading of the wavefield, attenuating noise, and attenuating seismic multiples, be performed in a manner which does not distort the amplitude of the seismic signal. In particular, the generation of nulls in the seismic signal spectrum and angular variation in the radiation pattern by the processing algorithms must be avoided. A relative amplitude preserved 3D seismic volume (200) may be a post-stack time-migration volume, a post-stack depth-migration volume, a pre-stack-time migration volume, or a pre-stack depth-migration volume.

Further, in Block 402 a surface of interest (306) is defined for which an attribute map (314) is required. The surface of interest (306) may be a depth of interest. Alternatively, the surface of interest (306) may be a geological surface, such as the top or the bottom of a hydrocarbon reservoir. The surface of interest (306) is further detailed in FIG. 3 and the discussion thereof.

In Block 404 the relative amplitude preserved 3D seismic volume (300) is transformed into at least one 3D low-frequency monospectral amplitude volume. In accordance with one or more embodiments, this transformation may be performed by applying a short-time window Fourier transform along the time axis of the relative amplitude preserved 3D seismic volume. In accordance with other embodiments, this transformation may be performed by applying a Gabor transform, or a Continuous Wavelet transform, along the time axis of the relative amplitude preserved 3D seismic volume. In accordance with still other embodiments, this transformation may be performed by applying a Discrete Wavelet transform along the time axis of the relative amplitude preserved 3D seismic volume. Other methods for transforming the relative amplitude preserved 3D seismic volume into a plurality of monospectral volumes may be apparent to one skilled in the art.

More specifically, in Block 404, filters are applied to the relative amplitude preserved 3D seismic volume. The filters may be spatial filters, such as spatially-smoothing filters, dip-guided filters, structure-oriented filters, deterministic filters, and statistical filters. The result of the application of spatial filters may include, without limitation, the reduction or removal of noise spikes, the removal, or outliers, or the increase in spatial smoothness of the relative amplitude preserved 3D seismic volume.

In Block 404, in accordance with some embodiments, a plurality of 3D low-frequency monospectral amplitude volumes (302) may be generated from the relative amplitude preserved 3D seismic volume (300). From this plurality of 3D low-frequency monospectral amplitude volumes (302), one 3D low-frequency monospectral amplitude volume (302) may be selected. The criteria for selecting one 3D low-frequency monospectral amplitude volume (300) may be based, at least in part, upon the spatial variations of the voxel values. For example, a 3D low-frequency monospectral amplitude volume (302) which varies smoothly in space may selected. Alternatively, or additionally, other selection criteria may be used.

In Block 406, a seismic attenuation volume (304) is determined based, at least in part, upon the relative amplitude preserved seismic volume. The seismic attenuation volume (304) may be determined by any one of a number of methods mentioned above in the discussion of FIG. 3.

In Block 408, in accordance with one or more embodiments, a low-frequency monospectral amplitude map (310) for the surface of interest (306) may be determined. The low-frequency monospectral amplitude map is determined by averaging the values of the low-frequency monospectral amplitude volume (302) over the voxels lying within the depth-window (308) associated with the surface of interest.

In Block 410, in accordance with one or more embodiments, a seismic attenuation map (312) for the surface of interest (306) is determined. The seismic attenuation map may be determined by averaging the values of the seismic attenuation volume (304) over the voxels lying within the depth-window (308) associated with the surface of interest.

In Block 412, according to some embodiments, an attribute map (314) is generated from the low-frequency monofrequency spectral amplitude map (310) and the seismic attenuation map (312). This attribute map (312) may be generated on a pixel-by-pixel basis, such that one pixel from the low-frequency monofrequency spectral amplitude map (310) and one pixel from the seismic attenuation map (312) uniquely determines one pixel in the attribute map (314). In other embodiments, a plurality of pixels from the low-frequency monofrequency spectral amplitude map (310) and a plurality of pixels from the seismic attenuation map (312) may contribute to one pixel, or to a plurality of pixels, in the attribute map (314).

In still other embodiments, the pixel-by-pixel computations may be supplemented by first calculating an average over a portion of pixels in either, or both, the low-frequency monospectral amplitude (310), and the seismic attenuation map (312).

In Block 414, according to some embodiments, the presence of hydrocarbon, including a natural gas deposit (120), such as methane, within the rock pores on the attribute map (314) is determined. In some embodiments, the presence of a gas deposit (120) may be indicated by pixels with a value of the attribute above a threshold value. In some embodiments, the presence of a gas deposit (120) may be indicated by pixels with a value of the attribute below a threshold value. The threshold values may be user determined, or may be calculated, based upon the range of pixel values in the attribute map. In accordance with other embodiments, a pixel value may be interpreted as a probability that a gas deposit (120) may exist at the location represented by the pixel on the attribute map. These indications of the presence of a gas deposit (120) may be evaluated automatically and stored in non-transitory computer memory. Alternatively, these indications of the presence of a gas deposit (120) may be manually inspected on a visual display.

In Block 416, in accordance to one or more embodiments, a well may be planned and drilled based, at least in part, upon the indications of the presence of a gas deposit (120) as displayed on the attribute map (314). Locations where the presence of a gas deposit (120) is indicated, or where the presence of a gas deposit (120) has a high probability, may be targeted by the well. Areas of the attribute map (314) where the presence of gas is not indicated, or where the presence of a gas deposit (120) has low probability, may be avoided.

Figure 5:
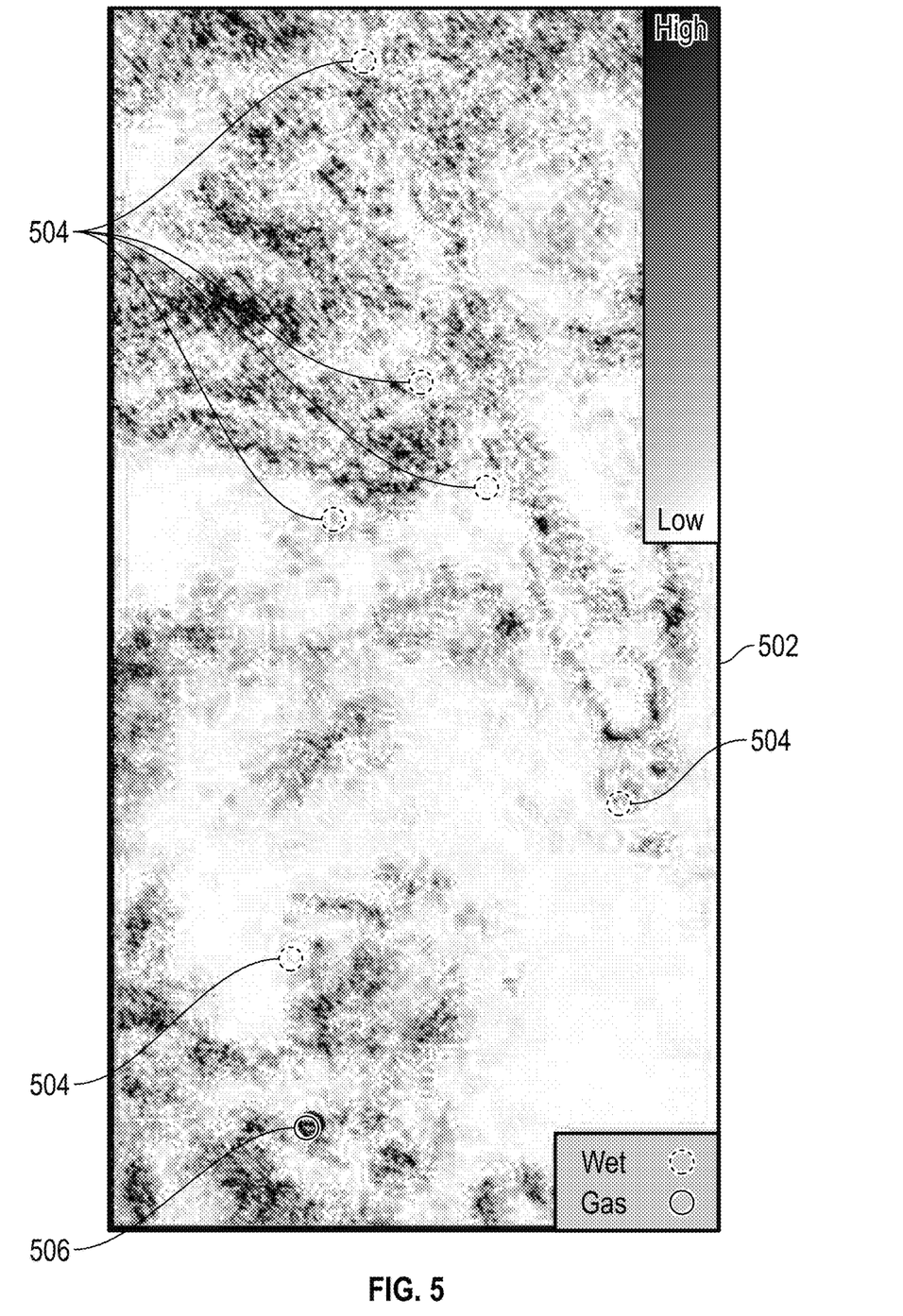
FIG. 5 shows an attribute map, in accordance with one or more embodiments.

FIG. 5 shows an example of an attribute map (502) for a surface of interest (306), in accordance with one or more embodiment. The abscissa and ordinate axes of FIG. 5 lie in the horizontal plane and the value of the attribute in each pixel is represented by the grayscale. In addition to the values of the attribute as a function of horizontal spatial position, the attribute map (502) also shows the location at which seven wells penetrate the surface of interest (306). Six of these wells (504) produce mainly, or only water, and are coincident with low values on the attribute map (502). The seventh well (506) produces mainly, or only, gas and coincide with a high value on the attribute map (502). This strong correlation between the value of the attribute, and the fluid produced from the wells, provide strong evidence that the attribute map (502) is a reliable indicator of the presence of a gas deposit (120).

Figure 6A:
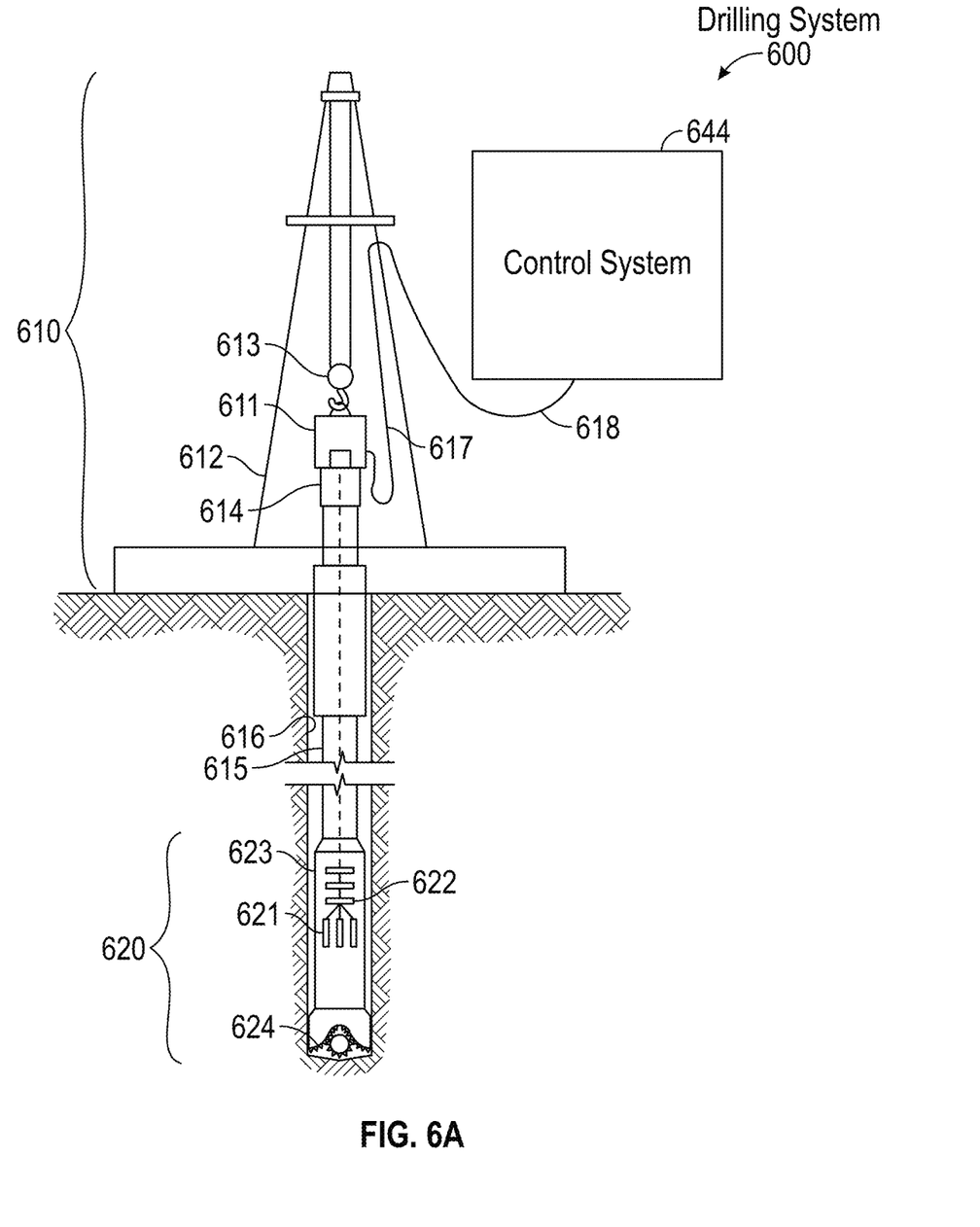
FIGS. 6A and 6B show systems in accordance with one or more embodiments.
Figure 6B:
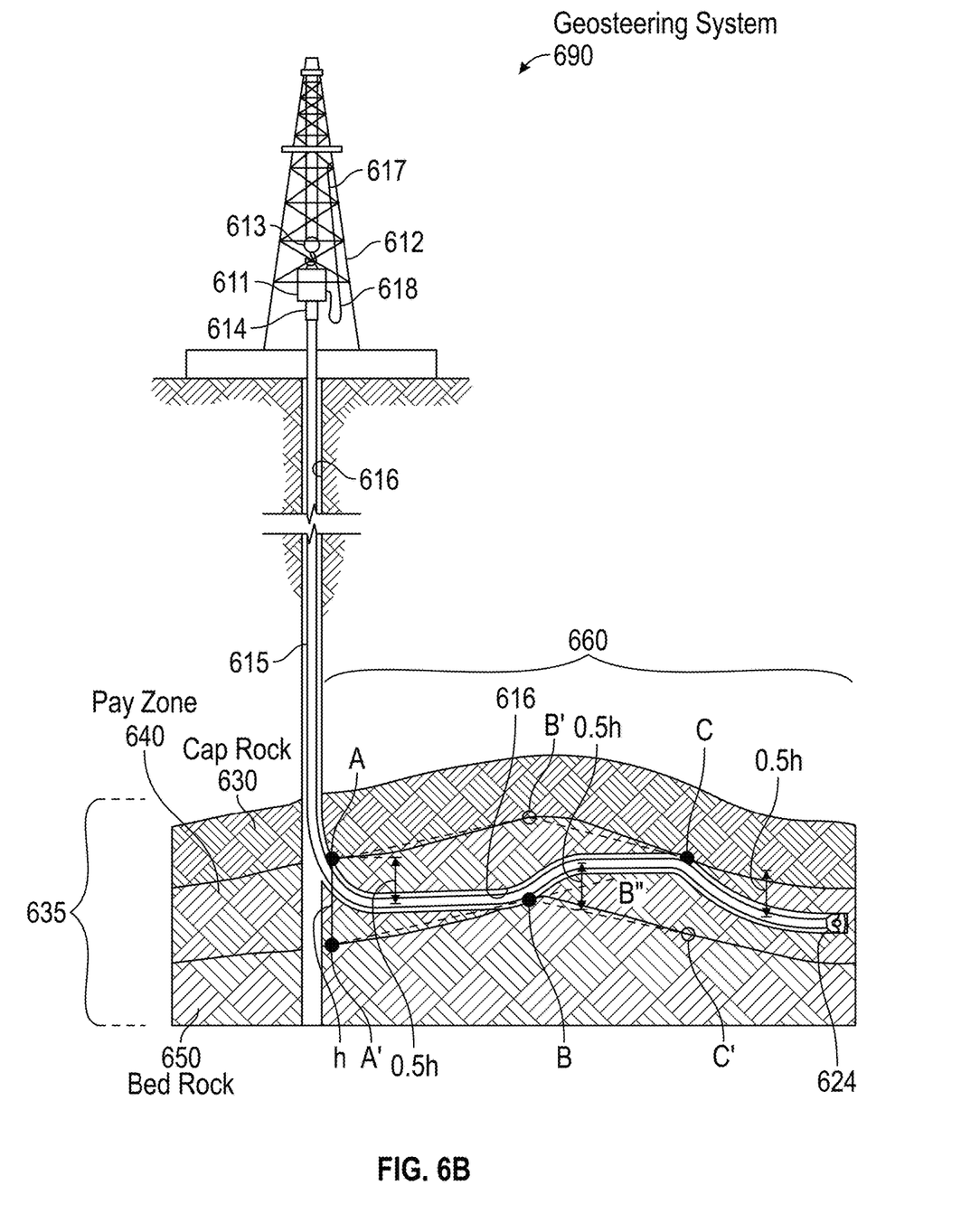

FIGS. 6A and 6B illustrate systems in accordance with one or more embodiments. As shown in FIG. 6A, a drilling system (600) may include a top drive drill rig (610) arranged around the setup of a drill bit logging tool (620). A top drive drill rig (610) may include a top drive (611) that may be suspended in a derrick (612) by a travelling block (613). In the center of the top drive (611), a drive shaft (614) may be coupled to a top pipe of a drill string (615), for example, by threads. The top drive (611) may rotate the drive shaft (614), so that the drill string (615) and a drill bit logging tool (620) cut the rock at the bottom of a wellbore (616). A power cable (617) supplying electric power to the top drive (611) may be protected inside one or more service loops (618) coupled to a control system (644). As such, drilling mud may be pumped into the wellbore (616) through a mud line, the drive shaft (614), and/or the drill string (615).

Moreover, when completing a well, casing may be inserted into the wellbore (616). The sides of the wellbore (616) may require support, and thus the casing may be used for supporting the sides of the wellbore (616). As such, a space between the casing and the untreated sides of the wellbore (616) may be cemented to hold the casing in place. The cement may be forced through a lower end of the casing and into an annulus between the casing and a wall of the wellbore (616). More specifically, a cementing plug may be used for pushing the cement from the casing. For example, the cementing plug may be a rubber plug used to separate cement slurry from other fluids, reducing contamination and maintaining predictable slurry performance. A displacement fluid, such as water, or an appropriately weighted drilling mud, may be pumped into the casing above the cementing plug. This displacement fluid may be pressurized fluid that serves to urge the cementing plug downward through the casing to extrude the cement from the casing outlet and back up into the annulus.

As further shown in FIG. 6A, sensors (621) may be included in a sensor assembly (623), which is positioned adjacent to a drill bit (624) and coupled to the drill string (615). Sensors (621) may also be coupled to a processor assembly (623) that includes a processor, memory, and an analog-to-digital converter (622) for processing sensor measurements. For example, the sensors (621) may include acoustic sensors, such as accelerometers, measurement microphones, contact microphones, and hydrophones. Likewise, the sensors (621) may include other types of sensors, such as transmitters and receivers to measure resistivity, gamma ray detectors, etc. The sensors (621) may include hardware and/or software for generating different types of well logs (such as acoustic logs or density logs) that may provide well data about a wellbore, including porosity of wellbore sections, gas saturation, bed boundaries in a geologic formation, fractures in the wellbore or completion cement, and many other pieces of information about a formation. If such well data is acquired during drilling operations (i.e., logging-while-drilling), then the information may be used to make adjustments to drilling operations in real-time. Such adjustments may include rate of penetration (ROP), drilling direction, altering mud weight, and many others drilling parameters.

In some embodiments, acoustic sensors may be installed in a drilling fluid circulation system of a drilling system (600) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, casing shoe positioning, etc.

The control system (644) may be coupled to the sensor assembly (623) in order to perform various program functions for up-down steering and left-right steering of the drill bit (624) through the wellbore (616). More specifically, the control system (644) may include hardware and/or software with functionality for geosteering a drill bit through a formation in a lateral well using sensor signals, such as drilling acoustic signals or resistivity measurements. For example, the formation may be a reservoir region, such as a pay zone, bed rock, or cap rock.

Turning to geosteering, geosteering may be used to position the drill bit (624) or drill string (615) relative to a boundary between different subsurface layers (e.g., overlying, underlying, and lateral layers of a pay zone) during drilling operations. In particular, measuring rock properties during drilling may provide the drilling system (600) with the ability to steer the drill bit (624) in the direction of desired hydrocarbon concentrations. As such, a geosteering system may use various sensors located inside or adjacent to the drilling string (615) to determine different rock formations within a wellbore's path. In some geosteering systems, drilling tools may use resistivity or acoustic measurements to guide the drill bit (624) during horizontal or lateral drilling.

Turning to FIG. 6B, FIG. 6B illustrates some embodiments for steering a drill bit through a lateral pay zone using a geosteering system (690). As shown in FIG. 6B, the geosteering system (690) may include the drilling system (600) from FIG. 6A. In particular, the geosteering system (690) may include functionality for monitoring various sensor signatures (e.g., an acoustic signature from acoustic sensors) that gradually or suddenly change as a well path traverses a cap rock (630), a pay zone (640), and a bed rock (650). Because of the sudden change in lithology between the cap rock (630) and the pay zone (640), for example, a sensor signature of the pay zone (640) may be different from the sensor signature of the cap rock (630). When the drill bit (624) drills out of the pay zone (640) into the cap rock (630), a detected amplitude spectrum of a particular sensor type may change suddenly between the two distinct sensor signatures. In contrast, when drilling from the pay zone (640) downward into the bed rock (650), the detected amplitude spectrum may gradually change.

During the lateral drilling of the wellbore (616), preliminary upper and lower boundaries of a formation layer's thickness may be derived from a geophysical survey and/or an offset well obtained before drilling the wellbore (616). If a vertical section (635) of the well is drilled, the actual upper and lower boundaries of a formation layer (i.e., actual pay zone boundaries (A, A')) and the pay zone thickness (i.e., A to A') at the vertical section (635) may be determined. Based on this well data, an operator may steer the drill bit (624) through a lateral section (660) of the wellbore (616) in real time. In particular, a logging tool may monitor a detected sensor signature proximate the drill bit (624), where the detected sensor signature may continuously be compared against prior sensor signatures, e.g., of the cap rock (630), pay zone (640), and bed rock (650), respectively. As such, if the detected sensor signature of drilled rock is the same or similar to the sensor signature of the pay zone (640), the drill bit (624) may still be drilling in the pay zone (640). In this scenario, the drill bit (624) may be operated to continue drilling along its current path and at a predetermined distance (0.5 h) from a boundary of a formation layer. If the detected sensor signature is same as or similar to the prior sensor signatures of the cap rock (630) or the bed rock (650), respectively, then the control system (644) may determine that the drill bit (624) is drilling out of the pay zone (640) and into the upper or lower boundary of the pay zone (640). At this point, the vertical position of the drill bit (624) at this lateral position within the wellbore (616) may be determined and the upper and lower boundaries of the pay zone (640) may be updated, (for example, positions B and C in FIG. 6B). In some embodiments, the vertical position at the opposite boundary may be estimated based on the predetermined thickness of the pay zone (640), such as positions B' and C'.

While FIGS. 6A, and 6B shows various configurations of components, other configurations may be used without departing from the scope of the disclosure. For example, various components in FIGS. 6A, and 6B may be combined to create a single component. As another example, the functionality performed by a single component may be performed by two or more components.

Figure 7:
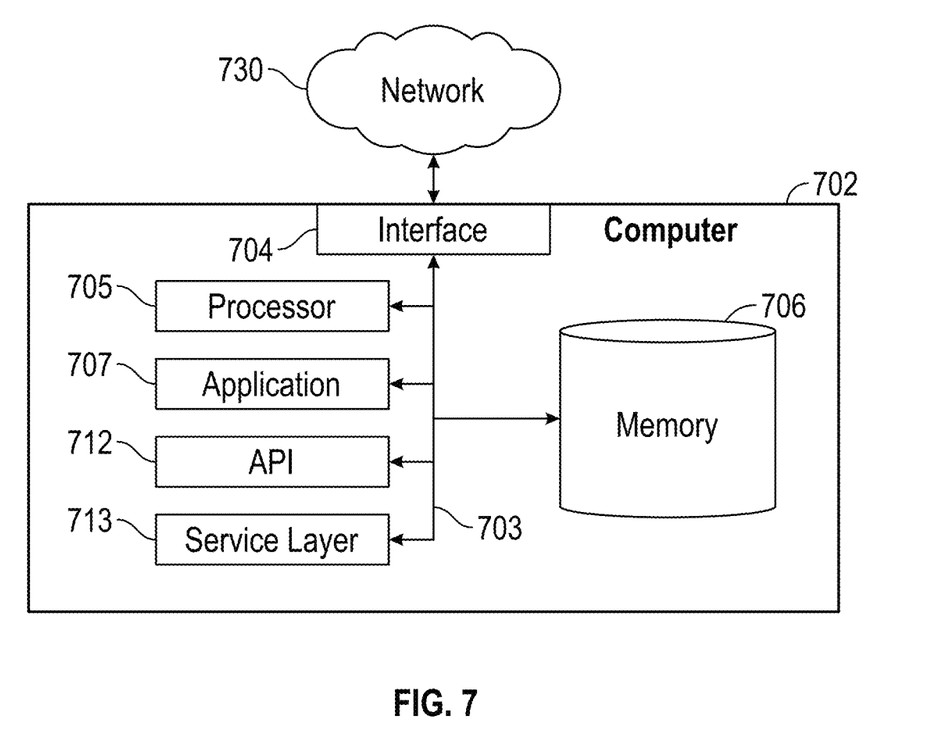
FIG. 7 shows a computer system in accordance with one or more embodiments.

Embodiments may be implemented on a computer system. FIG. 7 is a block diagram of a computer system (702) used to provide computational functionalities associated with described algorithms, methods, functions, processes, flows, and procedures as described in the instant disclosure, according to an implementation. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704 includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:
1. A method, comprising:
obtaining a relative amplitude preserved seismic volume acquired in a time-domain for a subterranean region of interest;
transforming, by a computer processor, the relative amplitude preserved seismic volume acquired in the time-domain into a low-frequency monospectral amplitude volume;
determining, by the computer processor, a seismic attenuation volume from the relative amplitude preserved seismic volume acquired in the time-domain;

generating, by the computer processor, a low-frequency monospectral amplitude map for a surface of interest by averaging the low-frequency monospectral amplitude volume over a depth-window around the surface of interest;

generating, by the computer processor, a seismic attenuation map for a surface of interest by averaging the seismic attenuation volume over a depth-window around the surface of interest;

determining an attribute map based, at least in part, on the seismic attenuation map for the surface of interest, and on the low-frequency monospectral amplitude map for the surface of interest;

determining a presence of gas in the subterranean region of interest based, at least in part, on the attribute map;

determining a well path through the subterranean region of interest using the attribute volume; and drilling the well path using a drilling system.

2. The method of claim 1:
wherein, the relative amplitude preserved seismic volume acquired in the time-domain, is a seismic volume selected from a group consisting of a post-stack time migration volume, a post-stack depth migration volume, a pre-stack time migration volume, and a pre-stack depth migration volume.

3. The method of claim 1:
wherein, the transforming of the relative amplitude preserved seismic volume acquired in a time-domain into a low-frequency monospectral amplitude volume, further comprises:
applying a filter to the low-frequency monospectral amplitude volume.

4. The method of claim 3:
wherein the filter may be selected from a group consisting of a spatially-smoothing filter, a dip-guided filter, a structure-oriented filter, a deterministic filter, and a statistical filter.

5. The method of claim 1:
wherein, the transforming of the relative amplitude preserved seismic volume acquired in a time-domain into a seismic attenuation volume, further comprises:
applying a filter to the seismic attenuation volume.

6. The method of claim 5:
wherein the filter may be selected from a group consisting of a spatially-smoothing filter, a dip-guided filter, a structure-oriented filter, a deterministic filter, and a statistical filter.

7. The method of claim 1:
wherein, the seismic attenuation volume may be selected from a group consisting of an effective attenuation volume, an intrinsic attenuation volume, and an instantaneous attenuation volume.

8. The method of claim 1:
wherein, the calculating an attribute map further comprises:
calculating a ratio of a value of at least one pixel in the seismic attenuation map for a surface of interest to a value of at least one pixel in the low-frequency monospectral amplitude map for the surface of interest.

9. The method of claim 1:
wherein, the calculating an attribute map further comprises:
calculating a ratio of a value of at least one pixel in the low-frequency monospectral amplitude map for a surface of interest to a value of at least one pixel in the seismic attenuation map for the surface of interest.

10. The method of claim 1:
wherein, the calculating an attribute map further comprises:
calculating the difference between a value of at least one pixel in the seismic attenuation map for a surface of interest to a value of at least one pixel in the low-frequency monospectral amplitude map for the surface of interest.

11. A system, comprising:
a well site;
a drilling system; and
a seismic processor comprising a computer processing unit capable of executing instructions stored in a non-transitory computer storage medium which causes the seismic processor to perform functions comprising:
obtaining, a relative amplitude preserved seismic volume acquired in a time-domain for a subterranean region of interest;
transforming, the relative amplitude preserved seismic volume acquired in the time-domain into a low-frequency monospectral amplitude volume;
determining, a seismic attenuation volume from the relative amplitude preserved seismic volume acquired in the time-domain;
generating, a low-frequency monospectral amplitude map for a surface of interest by averaging the low-frequency monospectral amplitude volume over a depth-window around the surface of interest;
generating, a seismic attenuation map for a surface of interest by averaging the seismic attenuation volume over a depth-window around the surface of interest;
determining, an attribute map based, at least in part, on the seismic attenuation map for the surface of interest, and on the low-frequency monospectral amplitude map for the surface of interest;
determining, a presence of gas in the subterranean region of interest based, at least in part, on the attribute map;
determining, a well path through the subterranean region of interest using the attribute volume; and
drilling the well path using a drilling system.

12. The system of claim 11:
wherein, the relative amplitude preserved seismic volume acquired in the time-domain, is a seismic volume selected from the group consisting of a post-stack time migration volume, a post-stack depth migration volume, a pre-stack time migration volume, and a pre-stack depth migration volume.

13. The system of claim 11:
wherein, the transforming of the relative amplitude preserved seismic volume acquired in the time-domain into a low-frequency monospectral amplitude volume, further comprises:
applying a filter to the low-frequency monospectral amplitude volume.

14. The system of claim 11:
wherein, the transforming of the relative amplitude preserved seismic volume acquired in the time-domain into a seismic attenuation volume, further comprises:
applying a filter to the seismic attenuation volume.

15. The system of claim 11:
wherein, the seismic attenuation volume may be selected from the group consisting of an effective attenuation volume, an intrinsic attenuation volume, and an instantaneous attenuation volume.

16. The system of claim 11:
wherein, the calculating an attribute map further comprises:
calculating a ratio of a value of at least one pixel in the seismic attenuation map for a surface of interest to a value of at least one pixel in the low-frequency monospectral amplitude map for the surface of interest.

17. The system of claim 11:
wherein, the calculating an attribute map further comprises:
calculating a ratio of a value of at least one pixel in the low-frequency monospectral amplitude map for a surface of interest to a value of at least one pixel in the seismic attenuation map for the surface of interest.

18. The system of claim 11:
wherein, the calculating an attribute map further comprises:
calculating the difference between a value of at least one pixel in the seismic attenuation map for a surface of interest to a value of at least one pixel in the low-frequency monospectral amplitude map for the surface of interest.

19. The system of claim 11, further comprising:
a non-transitory computer storage medium for storing one or more locations at which the presence of gas is indicated.

* * * * *